July 16, 1935.  J. A. WILHELM  2,008,344
HYDRAULIC STEERING GEAR
Filed Jan. 24, 1933  3 Sheets-Sheet 1
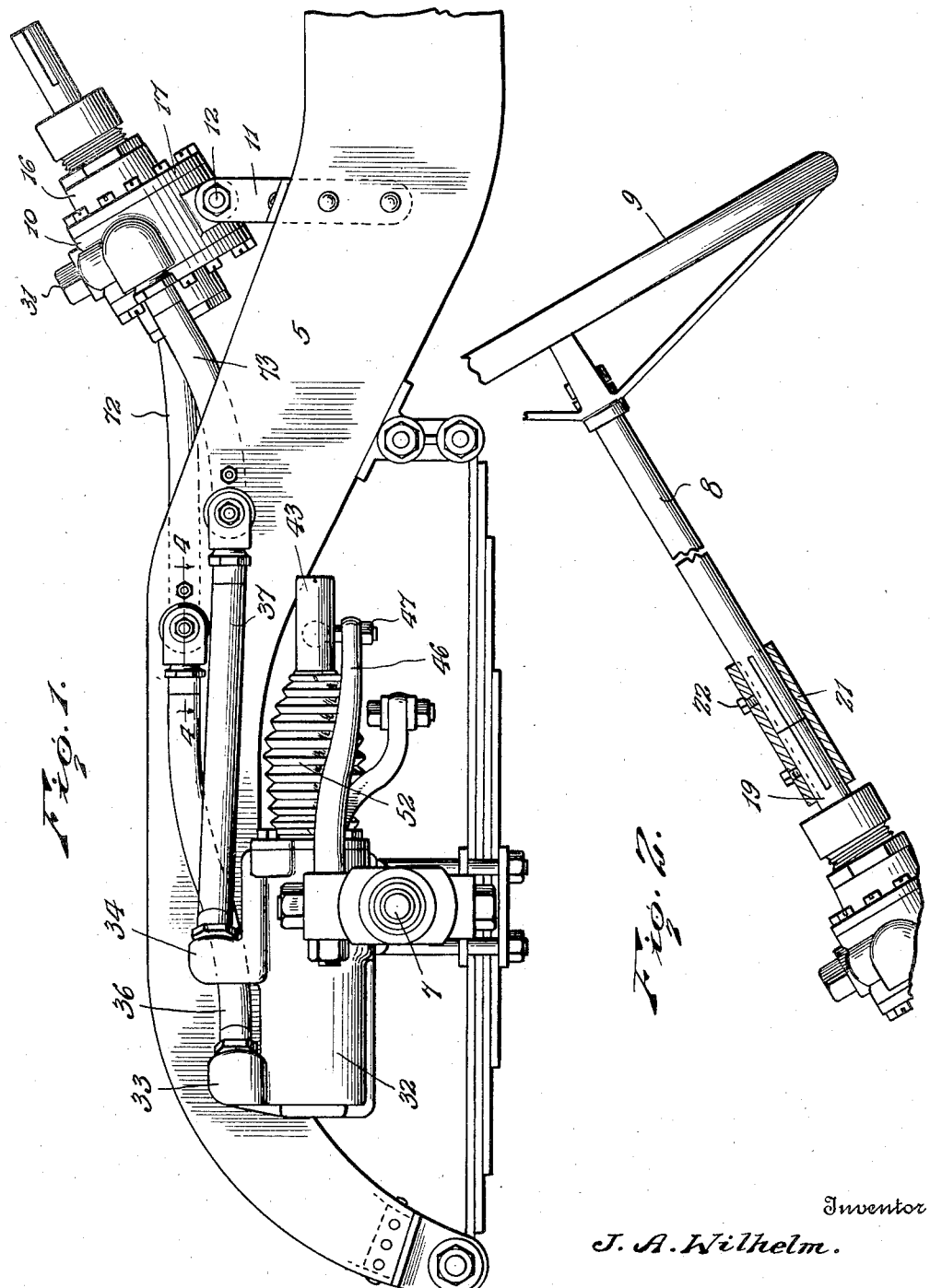
Inventor
J. A. Wilhelm.
By
Lacey & Lacey,
Attorneys

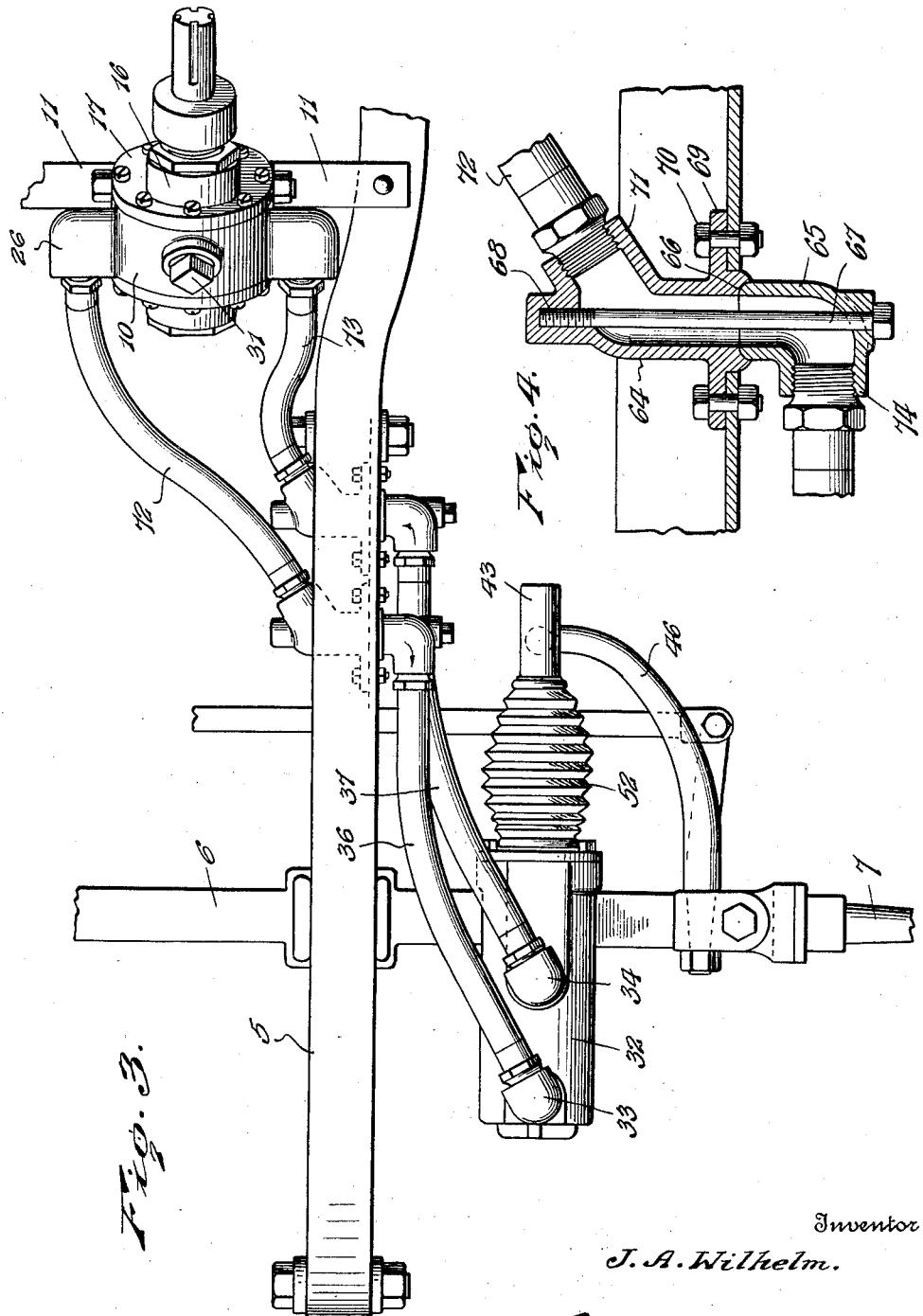

July 16, 1935.  J. A. WILHELM  2,008,344
HYDRAULIC STEERING GEAR
Filed Jan. 24, 1933  3 Sheets-Sheet 3
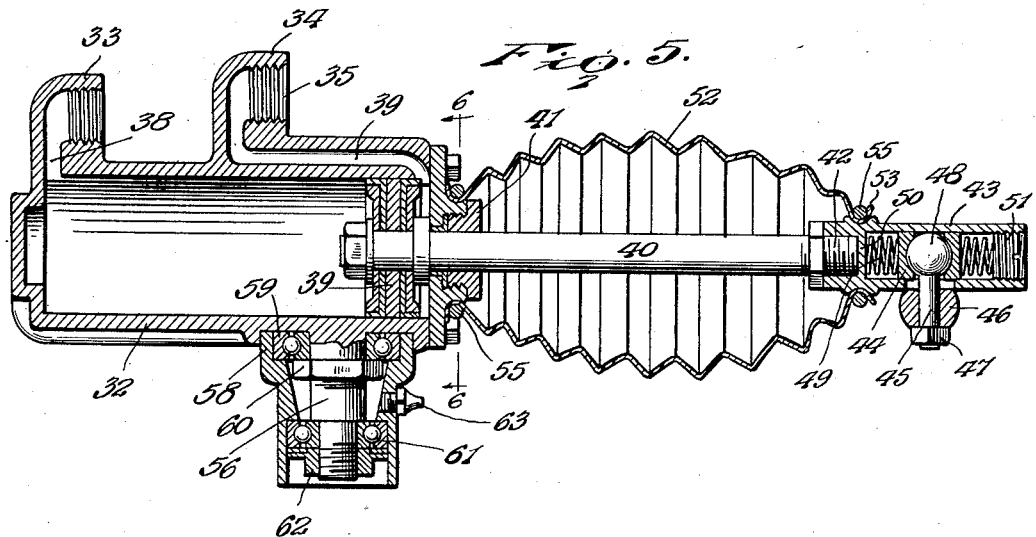
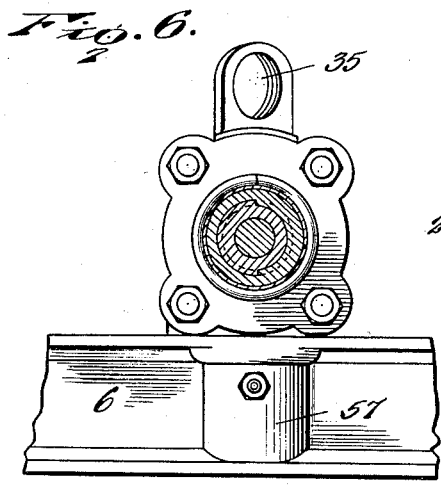
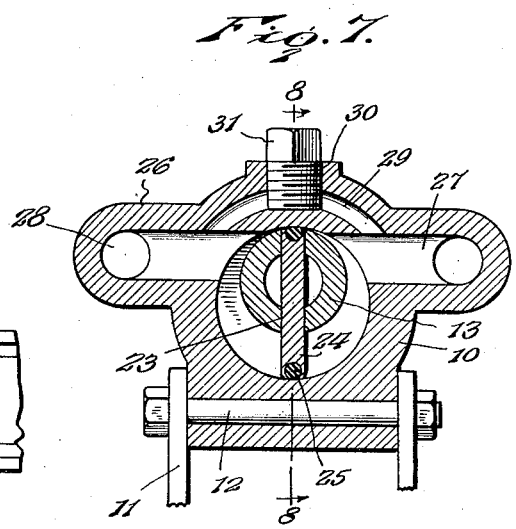
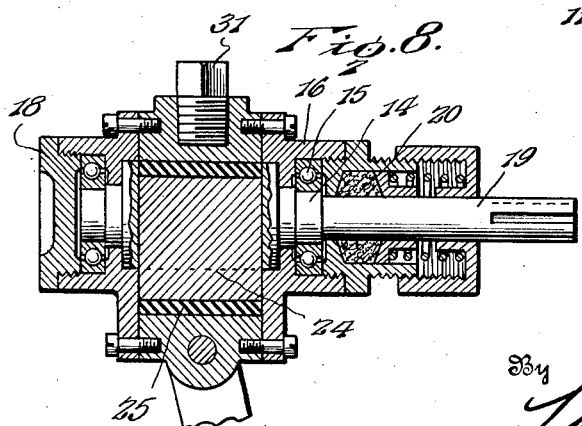
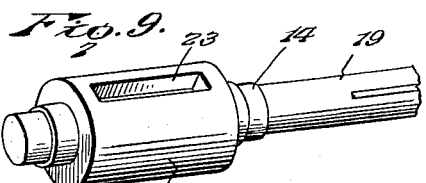
Inventor
J. A. Wilhelm.
By Lacey & Lacey,
Attorneys Patented July 16, 1935

2,008,344

UNITED STATES PATENT OFFICE 2,008,344

HYDRAULIC STEERING GEAR

John A. Wilhelm, North Bend, Wash., assignor of one-half to Carl L. Blakely, Snoqualmie Falls, Wash.

Application January 24, 1933, Serial No. 653,321

1 Claim. (Cl. 280—87)

This invention relates to power steering mechanism and more particularly to hydraulic steering gear for motor vehicles and other power-operated conveyances.

The object of the invention is to provide a steering device in which fluid under pressure is utilized for transmitting power from the steering wheel to the front wheels of the vehicle, thus dispensing with the usual drag link and its attendant disadvantages and permitting the vehicle to be steered more easily and with less exertion on the part of the operator than heretofore.

A further object of the invention is to provide a steering mechanism which is flexible, accurate, and positive in operation and in which friction and lost motion are reduced to a minimum, which will accurately and easily steer to a straight line, and which will positively prevent swerving of the vehicle from its true course should one or both front wheels drop suddenly due to inequalities in the roadway or other causes, thereby making driving much easier and safer under all conditions of highways.

A further object of the invention is generally to improve this class of devices so as to increase their utility, durability and efficiency.

In the accompanying drawings forming a part of this specification:

Figure 1 is a side view of a hydraulic steering gear embodying the present invention, showing it in position on a motor vehicle.

Figure 2 is a detail side elevation, partly in section, showing the manner of coupling the fluid pressure motor to the steering column.

Figure 3 is a top plan view.

Figure 4, is a detail longitudinal sectional view on the line 4—4 of Figure 1, showing the construction of the flexible joint between the rubber tubes.

Figure 5 is a longitudinal sectional view of the cylinder and its associated parts.

Figure 6 is a vertical sectional view taken on the line 6—6 of Figure 5.

Figure 7 is a transverse sectional view of the fluid pressure pump.

Figure 8 is a vertical sectional view taken on the line 8—8 of Figure 7.

Figure 9 is a detail perspective view of the pump rotor.

Similar numerals of reference indicate corresponding parts in all the figures of the drawings.

The improved hydraulic steering gear forming the subject matter of the present invention is particularly designed for use in connection with motor vehicles and other power driven conveyances and by way of illustration is shown applied to an automobile of conventional construction in which 5 designates the chassis, 6 the front axle, 7 the spindle, and 8 the steering column provided with the usual steering wheel 9.

The device comprises a fluid pressure pump including a casing 10 having its lower portion fitting between supporting brackets 11 extending from the chassis and on which the casing is pivotally mounted by means of a pin or bolt 12 extending through the brackets and casing, as best shown in Figure 7 of the drawings, thereby forming a flexible connection between the pump and chassis of the vehicle and preventing undue strain thereon when traveling over rough uneven roads.

Eccentrically mounted for oscillation within the casing 10 is a cylindrical rotor 13 having its opposite ends reduced at 14 and journaled in suitable bearings 15 disposed within cylindrical extensions 16 preferably formed integral with the heads 17 of the casing, as shown. A cap 18 is threaded in the end of one of the extensions 16 and forms a closure therefor and also serves to retain the adjacent bearing 15 in proper position. One of the reduced ends 14 of the rotor is extended longitudinally to form a stub shaft 19 which extends through a gland or packing 20 for connection with the steering column 8, the parts being splined and united by a coupling sleeve 21 spanning the junction of said members and retained in position by clamping screws or similar fastening devices 22.

The rotor 13 is provided with a longitudinal slot 23 in which is mounted a vane 24 having its opposite ends fitted with suitable packing strips 25 which bear against the inner wall of the pump cylinder and serve to prevent leakage between the parts. The casing 10 is provided with lateral arms 26 having fluid passages 27 formed therein which communicate with the cylindrical interior of the casing and also with outlet openings 28 disposed at substantially right angles to the passages 27, as shown. The pump casing is also provided with an arcuate passage 29 which communicates at its ends with the respective passages 27 and between its ends with a filling opening 30 formed in the top of the casing, there being a plug 31 threaded in the filling opening 30 to normally close the same. Oil or other actuating fluid is introduced within the system through the filling opening 30 after the plug 31 has been removed and it will, of course, be understood that the oil or other fluid will entirely fill the pump cylinder and passages so that movement imparted to the steering wheel will cause the vane 24 to displace the fluid within the cylinder and force it through either of the passages 27, according to the direction in which the steering wheel is turned.

Pivotally mounted for lateral swinging movement on the front axle 6 is a cylinder 32 having threaded nipples 33 and 34 extending upwardly therefrom and provided with interiorly threaded bores 35 to permit the attachment of the correspondingly threaded ends of high pressure rubber tubes or conduits 36 and 37. The nipples 33 and 34 are provided with passages 38 and 39 communicating with the interior of the cylinder at the opposite ends thereof and through which oil from the pump is delivered for the purpose of moving the piston 39 in either direction to effect steering of the front wheels of the vehicle, as will be more fully explained hereinafter. The piston 39 is secured to one end of a piston rod 40 which passes through a suitable gland or stuffing box 41 on the adjacent end of the cylinder and is provided with terminal threads 42 engaging corresponding threads on a tubular member or sleeve 43. Disposed within the tubular member 43 is one element 44 of a ball joint, the other element of which is in the form of a depending pin 45 having its lower end extended through the adjacent end of a steering arm 46 and rigidly secured thereto by means of a nut 47 engaging the threaded end of the pin and bearing against the arm, as shown in Figure 5 of the drawings. The member 44 is preferably formed in two sections, the opposing faces of which are concave to receive a spherical head or ball 48 fitted to the upper end of the pin 45, the parts being yieldably centered within the tubular member 43 by means of coil springs 49 disposed on opposite sides of the member 44 and bearing thereagainst. One of the springs 49 bears against a transverse partition 50 in the tubular member while the other spring bears against a removable plug 51 fitted to the end of the tubular member, as shown. Surrounding the piston rod 40 is a flexible and expansible shield 52 preferably pleated to permit expansion and contraction thereof as the piston moves within the cylinder. The expansible shield 52 is preferably substantially elliptical in shape, as shown, and serves to prevent the entrance of dust and dirt to the piston rod and its associated parts. The opposite ends of the shield are open and provided with terminal beads 53 which fit in annular seats formed on the tubular member 43 and the adjacent head of the cylinder 32 and are retained within said seats by clamping rings 55 so that the shield is securely anchored to both the cylinder and tubular member at all times. Depending from the bottom of the cylinder 32 is a pivot pin or stud 56 which fits within an enlargement 57 formed on the front axle 6 and thereby permits lateral tilting movement of the cylinder with respect to the chassis to accommodate the position of the front wheels of the vehicle when the latter are steered. The enlargement 57 is provided with a bell-shaped upper end 58 which fits in a correspondingly shaped recess in the bottom of the cylinder and serves to accommodate a roller bearing 59 which surrounds the upper portion of the pin 56 and is retained in proper position by a clamping nut 60 bearing thereagainst, as shown. A similar bearing 61 is mounted in the lower portion of the enlargement 57 and retained in position by a nut 62 engaging the threaded lower end of the pivot pin or stud. One side of the enlargement is provided with an opening through which oil may be introduced for lubricating the pin and its associated parts, said opening being normally closed by a removable plug 63.

Extending transversely through the chassis 5 are flexible couplings, each coupling consisting of companion fittings 64 and 65 having their abutting faces curved or beveled, as indicated at 66, to form a liquid and air tight ground joint, the members being retained in assembled position by means of a bolt 67 passing through one of the members and having its end portion threaded in the other member at 68. Each member 64 is provided with a lateral attaching flange 69 which bears against the adjacent face of the chassis and is rigidly secured thereto by bolts 70. The fittings 64 are each provided with a threaded nipple 71, one of which is connected with a length of rubber tubing 72 communicating with one of the inlet openings 28 of the pump while the other threaded nipple is connected with a similar length of tubing 73 communicating with the other inlet opening of the pump. The hose 36 connects with a threaded nipple 74 on one of the fittings 65 while the hose section 37 forms a connection between the nipple of the other fitting 65 and the inlet passage 35 of the cylinder so as to permit the free circulation of oil throughout the system.

In operation, the system is exhausted of air by removing the plug 31 and introducing oil or other fluid through the opening 30 until the entire system is filled. When the steering wheel 9 is moved in one direction, motion will be imparted to the vane 24 through the medium of the steering column and the swinging action of the vane will force the fluid outwardly through one of the passages 28 and through the rubber tubing sections 72 and 36 into the cylinder, thereby moving the piston 39 longitudinally and causing said piston, through the medium of the ball and socket connection and steering arm 46 to impart a corresponding movement to the front wheels of the vehicle. When the steering wheel is turned in the opposite direction, fluid will be forced through the tubes 73 and 37 to the other end of the cylinder and thereby move the front wheels accordingly. During the movement of the piston the shield 52 will expand and contract so as to accommodate itself to the stroke of the piston and, at the same time, effectually house and protect the adjacent parts. The pivotal connection between the cylinder and front axle permits the cylinder to accommodate itself to the movement of the front wheels of the vehicle while the pivotal connection between the fluid pressure pump and chassis allows sufficient flexibility between the parts to prevent damage to the pump incident to traveling over rough uneven road surfaces.

A hydraulic steering gear constructed in accordance with the present invention is flexible, accurate and positive in operation and will effectually prevent swerving of the vehicle from its true course and thereby make driving much easier and safer under all conditions of highways. While the steering gear is particularly designed for use in connection with automobiles, it will, of course, be understood that said gear may be used for other types of motor driven conveyances or for turning the rudder of a boat when steering the same, without departing from the spirit of the invention.

Having thus described the invention, what I claim is:

In hydraulic steering gear, the combination with a motor vehicle including a chassis, a front axle and steering column, of a fluid pressure pump mounted on the chassis and operatively connected with the steering column, a tubular projection on the axle having a bell-shaped upper end, a cylinder disposed over the axle, a pin depending from the cylinder into the projection on the axle, bearings within the projection supporting the pin and the cylinder and rotatably mounting the pin whereby the cylinder may have swinging movement, one of said bearings being disposed within the bell-shaped upper end of the projection, a piston working in the cylinder, connections between said piston and the steering wheels of the vehicle, and connections between the cylinder and the pump whereby fluid pressure may be applied to the piston.

JOHN A. WILHELM. [L. S.]